2,744,102
Patented May 1, 1956

2,744,102

ACETOXYDEHYDROABIETIC ACID DERIVATIVES

Lee A. Subluskey, Wilmington, Del., assignor to Hercules Powder Company, Wilmington, Del., a corporation of Delaware No Drawing. Application December 13, 1952,
Serial No. 325,892

9 Claims. (Cl. 260—99)

This invention relates to new dehydroabietic acid derivatives and, more particularly, to derivatives of dehydroabietic acid having an acetoxy group in the 9-position.

In accordance with this invention, it has been found that a new series of compounds containing an acetoxy group in the 9-position of the dehydroabietic acid nucleus may be prepared. The new products in accordance with this invention may be represented by the following structural formula:

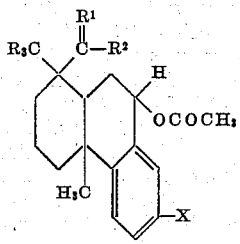

where $R^1$ may be $H_2$ or O and when $R^1$ is $H_2$, $R^2$ may be OH, O-alkyl, O-hydroxyalkyl, O-cycloalkyl, O-aralkyl, or O-acyl, and when $R^1$ is O, $R^2$ may be OH, O-alkyl, O-hydroxyalkyl, O-cycloalkyl, or O-aralkyl, and where X may be isopropyl, isopropenyl, acetyl, hydroxy, 1-hydroperoxyisopropyl, 1-hydroxyethyl, or 1-hydroxyisopropyl.

Each of these 9-acetoxydehydroabietic acid derivatives exists in two stereoisomeric forms known as epimerides. In one, named herein as the 9α-acetoxy derivatives, the acetoxy group is in trans position with reference to the methyl group which is attached to the 4a-position of the dehydroabietic acid nucleus. In the other, named herein as the 9β-acetoxy derivative, the acetoxy group is in cis relationship to the 4a-methyl group of the dehydroabietic acid nucleus. Thus, there are always two 9-acetoxydehydroabietic acid esters, for example, methyl 9α-acetoxydehydroabietate and methyl 9β-acetoxydehydroabietate, and ethyl 9α-acetoxydehydroabietate and ethyl 9β-acetoxydehydroabietate. In the same way, there are two 9-acetoxydehydroabietyl alcohols, namely, the 9α-acetoxydehydroabietyl alcohol and the 9β-acetoxydehydroabietyl alcohol. The same is true for the derivatives wherein the 7-isopropyl group has been converted to a 7-isopropenyl, 7-acetyl, etc., group.

These new compounds may be prepared by the acetolysis of 9-bromodehydroabietic acid or an ester thereof or of 9-bromodehydroabietyl alcohol or esters or ethers thereof, whereby the acetoxy group is introduced into the 9-position. It is then possible to convert the isopropyl group which is in the 7-position of these compounds to a hydroxy, isopropenyl, acetyl, etc., group to produce the new series of compounds. These new products are particularly important in the synthesis of the corresponding compounds containing a double bond in the 9(10)-position.

The following examples are illustrative of the new series of compounds in accordance with this invention.

All parts and percentages are by weight, unless otherwise indicated.

EXAMPLE 1

Methyl 9α-acetoxydehydroabietate

A mixture of 20 parts of methyl dehydroabietate, 12 parts of N-bromosuccinimide, and 0.005 part of benzoyl peroxide in 100 parts of anhydrous carbon tetrachloride was refluxed for 1 hour. Considerable amounts of hydrogen bromide were evolved toward the end of this period. The insoluble succinimide was removed by filtration and the filtrate was then evaporated under reduced pressure, whereby 28.2 parts of the brominated methyl dehydroabietate was obtained.

Four parts of this crystalline bromide was mixed with 1.5 parts of fused potassium acetate and 200 parts of glacial acetic acid and the mixture was heated at 80° C. for 6 hours, after which the major portion of the acetic acid was distilled off under reduced pressure. The residual solution was then diluted with water, neutralized with sodium bicarbonate, and extracted three times with ether. The combined ether extracts were dried with sodium sulfate and evaporated to dryness whereupon the residue crystallized. Recrystallization of this material first from methanol and then from isooctane gave two crops of crystals of methyl 9α-acetoxydehydroabietate. The latter was purified by chromatography on alumina and recrystallization from methanol, whereby a product was obtained having a melting point of 168°–168.5° C. with a specific rotation in chloroform of $[\alpha]_D^{25°}+30.8$. Its carbon and hydrogen analyses agreed with those of methyl 9α-acetoxydehydroabietate. That this product was the 9α-acetoxy compound was proved by refluxing it in collidine, whereupon no reaction took place. Had it been the 9β-acetoxy compound, the collidine treatment would have formed a double bond in the 9(10)-position.

EXAMPLE 2

Methyl 9α- and 9β-acetoxydehydroabietates

Fifty parts of methyl dehydroabietate and 30 parts of N-bromosuccinimide were mixed with 500 parts of carbon tetrachloride which had previously been cooled to 15° C. The reaction mixture was agitated while bubbling a stream of dry nitrogen through it and exposed to ultraviolet light. These conditions were maintained for one hour, during which time the temperature of the reaction mixture was not allowed to rise above 25° C. At the end of this time, the insoluble succinimide was removed by filtration.

The solution of the bromination product in carbon tetrachloride, which was the filtrate obtained above, was then poured into a solution of 50 parts of fused potassium acetate in 750 parts of glacial acetic acid. This acetolysis mixture was agitated under reduced pressure and heated at 80° C. until the carbon tetrachloride and acetic acid solvents had been removed by evaporation. The residue so obtained was dissolved in 700 parts of ether and the ethereal solution was washed with water, then with a saturated sodium carbonate solution, and finally with water again, and dried. On removal of the ether, there was obtained 51.2 parts of a crystalline solid. The ultraviolet absorption of this solid indicated the presence of a double bond in the 14(15)-position in a portion of the product, indicating that the bromination product had contained some methyl 14-bromodehydroabietate. Recrystallization of this solid from hexane reduced the 14(15)-unsaturation but did not completely remove it. A portion of this recrystallized material was then hydrogenated in ethyl acetate with a palladium-on-carbon catalyst whereby all of the 14(15)-unsaturation was removed. The product so obtained had a melting point of 154°–161° C. and was a mixture of methyl 9α-acetoxydehydroabietate and methyl 9β-acetoxydehydroabietate.

That the above product was a mixture of the 9α- and 9β-acetoxy derivatives was shown by refluxing a portion of the mixture in collidine for 40 hours, after which the reaction mixture was dissolved in ether, washed with dilute hydrochloric acid, dried, and evaporated to dryness. Crystallization of this product yielded a pure methyl 9α-acetoxydehydroabietate having a melting point of 167°–168° C. Evaporation of the mother liquors from this crystallization gave an oil which exhibited the characteristic ultraviolet absorption of 9(10)-unsaturation. Inasmuch as the 9α-acetoxy compound is stable toward collidine, whereas the 9β-acetoxy compound is not (being deacetylated to yield a 9(10)-double bond, it is clear that the above acetoxy product melting at 154°–161° C. must be a mixture of methyl 9α-acetoxydehydroabietate and methyl 9β-acetoxydehydroabietate.

EXAMPLE 3

*Methyl 9α-acetoxy-14(15)-dehydro-dehydroabietate*

Two parts of methyl 9α-acetoxydehydroabietate having a melting point of 167°–168° C. was brominated with 1.0 part of N-bromosuccinimide in 50 parts of carbon tetrachloride under the same reaction conditions employed in Example 2 except that the reaction time was limited to 20 minutes. After removal of the succinimide by filtration, the carbon tetrachloride solvent was removed by distillation under reduced pressure. The crystalline residue of methyl 9α-acetoxy-14-bromodehydroabietate so obtained had a melting point of 130.5°–131.5° C.

One part of the above product was mixed with 0.5 part of fused potassium acetate in 25 parts of glacial acetic acid and heated on a steam bath for 2 hours. At the end of this time, the reaction mixture was diluted with 100 parts of water, neutralized with sodium bicarbonate, and then was extracted with ether. The ethereal extract was washed with water and dried with sodium sulfate. On removal of the ether, there was obtained an oil which on crystallization from methanol yielded a product having a melting point of 118°–119° C. and unsaturation at the 14(15)-position as shown by ultraviolet absorption. Thus, this product was methyl 9α-acetoxy-14(15)-dehydro-dehydroabietate, another name for which is the methyl ester of 9α-acetoxy-1,2,3,4,4a,9,10,10a-octahydro - 7 - isopropenyl-1,4a-dimethyl-1-phenanthrenecarboxylic acid.

EXAMPLE 4

*Methyl ester of 9α-acetoxy-7-acetyloctahydro-1,4a-dimethyl-1-phenanthrenecarboxylic acid*

Methyl dehydroabietate was brominated with N-bromosuccinimide by the same procedure as that described in paragraph (1) of Example 1. The crude bromination product so obtained was mixed with 12 parts of fused potassium acetate and 200 parts of glacial acetic acid and heated at 80° C. for 4 hours. The reaction mixture was allowed to stand at room temperature for about 60 hours, after which it was poured into water and the aqueous mixture was neutralized with sodium bicarbonate and extracted three times with ether. The combined ethereal extracts were dried with sodium sulfate and evaporated to dryness.

The crude crystalline acetoxy derivative so obtained was then ozonized, whereby a product was obtained which gave a positive iodoform reaction indicating the presence of a methyl ketone. The latter could only be present if bromination had taken place at the 14-position with subsequent dehydrobromination by means of the potassium acetate treatment followed by oxidation. Thus, the original bromide had contained some methyl 9β-14-dibromodehydroabietate which on acetolysis yielded the methyl 9α-acetoxy-14(15)-dehydro-dehydroabietate described in Example 3.

Ozonization of this methyl 9α-acetoxy-14(15)-dehydro-dehydroabietate was carried out in an acetic acid—methanol solution at 0° C. The intermediate ozonide was decomposed with a boiling 50% aqueous methanol solution and the product was precipitated by adding water to the reaction mixture and collected by filtration. After recrystallization from methanol, it had a melting point of 112°–112.5° C. Its carbon and hydrogen analysis was in agreement with that for the methyl ester of 9α-acetoxy-7-acetyl-1,2,3,4,4a,9,10,10a-octahydro - 1,4a - dimethyl-1-phenanthrenecarboxylic acid and its ultraviolet absorption spectrum indicated an acetyl aromatic structure.

EXAMPLE 5

*9α- and 9β-acetoxydehydroabietyl p-chlorobenzoates and 9α- and 9β-acetoxy-14(15)-dehydro-dehydroabietyl p-chlorobenzoates*

An agitated mixture of 75 parts of dehydroabietyl p-chlorobenzoate, 40 parts of N-bromosuccinimide, 4000 parts of carbon tetrachloride, a trace of p-cymyl cumpl peroxide, and a trace of di-tert-butyl peroxide was cooled to −6° C. and exposed to ultraviolet light for 2 hours. At the end of this time, bromination was complete and the insoluble succinimide was removed from the reaction mixture by filtration.

That bromination took place at both the 9- and 14-positions was demonstrated by acetolysis of the bromo product. To the carbon tetrachloride solution of the above bromo product was added 200 parts of potassium acetate and 300 parts of acetic acid. This reaction mixture was agitated at 20°–25° C. under reduced pressure evaporating conditions for 3 days, 200 parts of acetic acid being added twice during this period. The concentrated reaction mixture was then added to 2000 parts of water, whereupon the acetolysis product precipitated and was separated by filtration. This acetolysis product amounted to 96 parts and had a saponification number of 238. It was a mixture of 9α- and 9β-acetoxydehydroabietyl p-chlorobenzoate, 9α- and 9β-acetoxy-14(15)-dehydro-dehydroabietyl p-chlorobenzoate, and 9(10)-dehydro-dehydroabietyl p-chlorobenzoate, the latter three products having been produced by dehydrobromination at the 14(15)- or 9(10)-positions during the acetolysis reaction.

This acetolysis product was then hydrogenated by dissolving it in 1500 parts of ethyl acetate and hydrogenating at atmospheric pressure using 5 parts of a 5% palladium-on-carbon catalyst. After removal of the catalyst and the ethyl acetate solvent, 72 parts of a viscous oil was isolated. This oil consisted chiefly of 9α-acetoxydehydroabietyl p-chlorobenzoate as was shown by the fact that upon saponification and crystallization it yielded 9α-hydroxydehydroabietyl alcohol, the latter being proven by comparison with an authentic sample of this diol.

The new series of compounds in accordance with this invention is prepared by the acetolysis of 9α- and/or 9β-bromodehydroabietic acid and esters thereof or by the acetolysis of 9α- and/or 9β-bromodehydroabietyl alcohol and esters or ethers thereof. The 9-bromodehydroabietic acid derivatives are obtained by the bromination of dehydroabietic acid or an ester or other derivative thereof, provided that said derivative is not substituted in the 9-position, by contacting the dehydroabietic acid or said derivatives with an N-bromoimide, as, for example, N-bromosuccinimide, under substantially anhydrous conditions at a temperature of from about −20° C. to about 80° C., and preferably from about −10° C. to about 5° C. The product obtained by this bromination reaction is, of course, a mixture of the two epimers. For example, in the bromination with an N-succinimide of methyl dehydroabietate, the product which is obtained is a mixture of methyl 9α-bromodehydroabietate and methyl 9β-bromodehydroabietate and may also contain methyl 9α,14-dibromodehydroabietate and methyl 9β,14-dibromodehydroabietate. In the same way, the 9α-bromodehydroabietyl, 9β-bromodehydroabietyl, and 9α,- and β,-14-dibromodehydroabietyl alcohols are obtained by bromination of dehydroabietyl alcohol with an N-bromoimide.

The acetolysis reaction is carried out by contacting the bromo compound with an anhydrous alkali metal acetate, as, for example, sodium acetate, potassium acetate, etc., preferably in glacial acetic acid as a reaction medium. In general, the acetolysis reaction is carried out at a temperature of from about 10° C. to about 100° C. Either the pure 9α- or 9β-bromo compound or a mixture of these epimers may be subjected to this acetolysis reaction.

These 9α- and 9β-acetoxy compounds may be subjected to a variety of reactions to produce the new series of compounds in accordance with this invention. For example, those compounds having a carboxyl group in the 1-position may undergo the usual reactions of salt formation, alcoholysis, aminolysis, reduction, etc., to form the corresponding salt, ester, amide, alcohol, etc. In the same way, those compounds having a methylol group in the 1-position may be esterified or etherified to form the esters and ethers of 9-acetoxydehydroabietyl alcohol.

The compounds having an isopropenyl group in the 7-position and an acetoxy group in the 9-position may be prepared in two ways. An ester of dehydroabietic acid or dehydroabietyl alcohol or an ester or ether thereof may be brominated to produce the corresponding 9,14-dibromo compounds and these dibromides then acetylized, whereby the bromine in the 9-position is replaced by an acetoxy group and the bromine in the 14-position is removed by dehydrobromination by means of the acetolysis reaction as has been shown in Example 4 above. Another method of preparing these 7-isopropenyl compounds is to brominate a compound already containing the acetoxy group in the 9-position. For example, methyl 9-acetoxydehydroabietates, 9-acetoxydehydroabietyl alcohols, etc., may be brominated to obtain the corresponding 9-acetoxy-14-bromo compounds. These bromoacetoxy derivatives may then be dehydrobrominated by warming them in collidine or heating them with potassium acetate or by any of the other common means of dehydrobromination. Thus, from the esters of dehydroabietic acid it is possible to produce the methyl, ethyl, propyl, glycerol, cyclohexyl, etc., esters of 9α- and 9β-acetoxy-1,2,3,4,4a,9,10,10a-octahydro-7-isopropenyl-1,4a-dimethyl-1-phenanthrenecarboxylic acids, which compounds may also be named as the esters of 9α- and 9β-acetoxy-14(15)-dehydro-dehydroabietic acids.

The isopropenyl group in the 7-position of the compounds described above may be converted to an acetyl group by ozonolysis. For example, methyl 9α-acetoxy-14(15)-dehydro-dehydroabietates may be subjected to ozonolysis and produce thereby the methyl ester of 9α- and β-acetoxy-7-acetyl-1,2,3,4,4a,9,10,10a-octahydro-1,4a-dimethyl-1-phenanthrenecarboxylic acids. The acetyl group in the 7-position may then be reduced to a 1-hydroxyethyl group to produce the methyl ester of 9α- and β - acetoxy - 7 - (1-hydroxyethyl)-1,2,3,4,4a,9,10,10a-octahydro-1,4a-dimethyl-1-phenanthrenencarboxylic acids.

The above-described 7-isopropenyl compounds may also be oxidized with free oxygen in the presence of a peroxide catalyst to produce a hydroperoxide, the hydroperoxy group being attached to the 14-position of the dehydroabietyl nucleus. For example, methyl 9-acetoxy-14-hydroperoxydehydroabietate is obtained from methyl 9-acetoxy-14(15)-dehydro-dehydroabietate, etc. This hydroperoxide may then be reduced by means of a nonmetallic reducing agent to the corresponding 14-hydroxy compound, i. e., a 1-hydroxyisopropyl group in the 7-position, or it may be cleaved by means of a metallic reducing agent, whereby a hydroxyl radical replaces the isopropyl group in the 7-position. Thus, it is possible to produce such compounds as the esters of 9α- and β-acetoxy-14-hydroperoxydehydroabietic acids, 9α- and β-acetoxy-14-hydroxydehydroabietic acids, and 9α- and β-acetoxy-1,2,3,4,4a,9,10,10a - octahydro-7-hydroxy - 1,4a - dimethyl-1-phenanthrenecarboxylic acids.

The new series of 9-acetoxydehydroabietyl derivatives in accordance with this invention will, of course, have a wide variety of uses. All of these 9-acetoxy derivatives may be hydrolyzed to produce the corresponding 9-hydroxy compounds. They may also be deacetylated to produce the series of compounds wherein the acetoxy group in the 9-position and one of the hydrogens in the 10-position have been removed to produce a compound containing an ethylene double bond in the 9(10)-position. The latter compounds may be used as plasticizers for cellulose ethers and esters, in adhesive compositions, etc. Obviously, the compounds of this invention may be used in the synthesis of many other compounds in addition to the free alcohol or the 9(10)-olefin.

What I claim and desire to protect by Letters Patent is:
1. As a new composition of matter, a compound having the formula

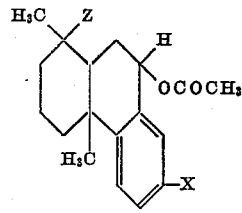

where Z is selected from the group consisting of methylol, acyloxymethyl, carboxy, and carboalkoxy and X is one of the group consisting of isopropyl, isopropenyl, acetyl, hydroxy, 1-hydroperoxyisopropyl, 1-hydroxyethyl, and 1-hydroxyisopropyl, where acyl is the acyl radical of a carboxylic acid.

2. An alkyl ester of 9-acetoxydehydroabietic acid.
3. An alkyl ester of 9-acetoxy-octahydro-7-isopropenyl-1,4a-dimethyl-1-phenanthrenecarboxylic acid.
4. An alkyl ester of 9-acetoxy-7-acetyl-octahydro-1,4a-dimethyl-1-phenanthrenecarboxylic acid.
5. A carboxylic acid ester of 9-acetoxydehydroabietyl alcohol.
6. Methyl 9-acetoxydehydroabietate.
7. Methyl 9-acetoxy-octahydro-7-isopropenyl-1,4a-dimethyl-1-phenanthrenecarboxylate.
8. Methyl 9-acetoxy-7-acetyl-octahydro-1,4a-dimethyl-1-phenanthrenecarboxylate.
9. The process of preparing a 9-acetoxydehydroabietic acid derivative which comprises reacting a bromo compound selected from the group consisting of 9-bromodehydroabietic acid and alkyl esters thereof and 9-bromodehydroabietyl alcohol and carboxylic acid esters thereof, with an alkali metal acetate at a temperature of from about 10° C. to about 100° C.

No references cited.